(12) United States Patent
Kosuge (10) Patent No.: US 8,519,936 B2
(45) Date of Patent: Aug. 27, 2013

(54) LIQUID CRYSTAL DISPLAY DEVICE AND DRIVING METHOD OF THE SAME

(75) Inventor: Masahiro Kosuge, Nagano (JP)

(73) Assignee: Japan Display West Inc., Aichi-Ken (JP)

( * ) Notice: Subject to any disclaimer, the term of this patent is extended or adjusted under 35 U.S.C. 154(b) by 169 days.

(21) Appl. No.: 12/978,906

(22) Filed: Dec. 27, 2010

(65) Prior Publication Data

US 2011/0164072 A1  Jul. 7, 2011

(30) Foreign Application Priority Data

Jan. 5, 2010 (JP) ................ P2010-000424

(51) Int. Cl.
*G09G 3/36* (2006.01)
*G09G 5/10* (2006.01)
*G02F 1/1333* (2006.01)
*C09K 19/52* (2006.01)

(52) U.S. Cl.
USPC ............ 345/101; 345/87; 345/690; 349/161; 349/168; 349/169; 349/177

(58) Field of Classification Search
USPC ................ 345/87, 101; 349/72, 169–169, 349/177
See application file for complete search history.

(56) References Cited

U.S. PATENT DOCUMENTS

| 3,779,751 A | * | 12/1973 | Haas et al. | 430/20 |
| 3,790,251 A | * | 2/1974 | Wysocki et al. | 349/34 |
| 3,873,186 A | * | 3/1975 | Ritchie | 349/74 |
| 3,891,307 A | * | 6/1975 | Tsukamoto et al. | 252/299.7 |
| 3,984,343 A | * | 10/1976 | Cole et al. | 349/179 |
| 4,093,355 A | * | 6/1978 | Kaplit et al. | 349/161 |
| 4,099,857 A | * | 7/1978 | Hareng et al. | 349/22 |
| 4,227,778 A | * | 10/1980 | Raynes | 349/168 |
| 4,279,152 A | * | 7/1981 | Crossland | 374/162 |
| 4,380,372 A | * | 4/1983 | Taguchi | 349/188 |
| 4,391,492 A | * | 7/1983 | Lu et al. | 349/21 |
| 4,472,026 A | * | 9/1984 | Boyd et al. | 349/21 |

(Continued)

FOREIGN PATENT DOCUMENTS

| JP | 2001-242444 | 9/2001 |
| JP | 2001-249363 | 9/2001 |

(Continued)

OTHER PUBLICATIONS

Ekisho vol. 9, No. 2 pp. 83-95.

*Primary Examiner* — Bipin Shalwala
*Assistant Examiner* — Matthew Fry
(74) *Attorney, Agent, or Firm* — K&L Gates LLP (57) ABSTRACT

A liquid crystal display device includes: first and second substrates between which a liquid crystal forming material is sandwiched and which are disposed to be opposite to each other; a pair of electrodes including one and the other electrodes; a control means for controlling a voltage applied between the electrodes; and a temperature detector. The control means applies a voltage, by which a change of light transmittance occurs based on an induction and disappearance phenomenon of a nematic phase in the liquid crystal forming material, between the electrodes when a temperature of the liquid crystal forming material is in an isotropic phase temperature range, and the control means applies a voltage, by which a change of light transmittance occurs based on a change of orientation of directors of the liquid crystal forming material, between the electrodes when the temperature of the liquid crystal forming material is in a nematic phase temperature range.

11 Claims, 4 Drawing Sheets

(56) References Cited

U.S. PATENT DOCUMENTS

| | | | |
|---|---|---|---|
| 4,685,771 A * | 8/1987 | West et al. | 349/94 |
| 4,902,107 A * | 2/1990 | Tsuboyama et al. | 349/72 |
| 4,965,591 A | 10/1990 | Kurabayashi et al. | 347/221 |
| 5,059,000 A * | 10/1991 | Kaneko et al. | 349/20 |
| 5,172,256 A * | 12/1992 | Sethofer et al. | 349/14 |
| 5,189,534 A * | 2/1993 | McDonnell et al. | 349/22 |
| 5,422,033 A * | 6/1995 | Mochizuki et al. | 252/299.01 |
| 5,548,420 A * | 8/1996 | Koshimizu et al. | 349/21 |
| 5,566,012 A * | 10/1996 | Koshimizu et al. | 349/116 |
| 5,645,758 A * | 7/1997 | Kawasumi et al. | 252/299.01 |
| 5,746,939 A * | 5/1998 | Taniguchi et al. | 252/299.01 |
| 5,844,643 A * | 12/1998 | Onishi et al. | 349/93 |
| 6,072,455 A * | 6/2000 | Matsui et al. | 345/97 |
| 6,266,109 B1 * | 7/2001 | Yamaguchi et al. | 349/86 |
| 6,452,581 B1 * | 9/2002 | Katakura et al. | 345/101 |
| 6,532,046 B1 * | 3/2003 | Yamashita et al. | 349/86 |
| 7,385,582 B2 * | 6/2008 | Hudson | 345/101 |
| 7,410,678 B2 * | 8/2008 | Choi | 428/1.1 |
| 7,639,327 B2 * | 12/2009 | Ozawa | 349/114 |
| 7,639,332 B2 * | 12/2009 | Miyachi et al. | 349/129 |
| 7,929,067 B2 * | 4/2011 | Irie | 349/21 |
| 2001/0038372 A1 * | 11/2001 | Lee | 345/89 |
| 2001/0055007 A1 * | 12/2001 | Miura et al. | 345/204 |
| 2004/0036834 A1 * | 2/2004 | Ohnishi et al. | 349/177 |
| 2005/0041196 A1 * | 2/2005 | Ishihara et al. | 349/181 |
| 2005/0111783 A1 * | 5/2005 | Thackara | 385/16 |
| 2005/0162607 A1 * | 7/2005 | Miyachi et al. | 349/179 |
| 2005/0179632 A1 * | 8/2005 | Miyachi et al. | 345/87 |
| 2006/0071878 A1 * | 4/2006 | Heckmeier et al. | 345/30 |
| 2007/0024553 A1 * | 2/2007 | Araki et al. | 345/87 |
| 2007/0114490 A1 * | 5/2007 | Furue et al. | 252/299.01 |
| 2007/0126757 A1 * | 6/2007 | Itoh et al. | 345/690 |
| 2007/0285377 A1 * | 12/2007 | Yamazaki | 345/101 |
| 2007/0288780 A1 * | 12/2007 | Yamazaki | 713/322 |
| 2008/0007666 A1 * | 1/2008 | Takeda et al. | 349/43 |
| 2008/0106689 A1 * | 5/2008 | Inoue et al. | 349/181 |
| 2009/0073332 A1 * | 3/2009 | Irie | 349/20 |
| 2010/0328594 A1 * | 12/2010 | Ishii et al. | 349/139 |
| 2011/0043716 A1 * | 2/2011 | Hiji et al. | 349/25 |
| 2011/0242473 A1 * | 10/2011 | Haseba et al. | 349/139 |
| 2012/0023453 A1 * | 1/2012 | Wagner | 715/848 |
| 2013/0002990 A1 * | 1/2013 | Kosuge et al. | 349/72 |
| 2013/0083284 A1 * | 4/2013 | Junge | 349/196 |

FOREIGN PATENT DOCUMENTS

| | | |
|---|---|---|
| JP | 2001-265298 | 9/2001 |
| JP | 2002-071293 | 3/2002 |
| JP | 2002-072193 | 3/2002 |
| JP | 2004-139018 | 5/2004 |
| JP | 2005-181746 | 7/2005 |
| JP | 2007-323046 | 12/2007 |
| JP | 11-183937 | 7/2010 |

* cited by examiner

FIG.2A
ISOTROPIC PHASE (I PHASE)

FIG.2B
NEMATIC PHASE (N PHASE)

LIQUID CRYSTAL DISPLAY DEVICE AND DRIVING METHOD OF THE SAME

CROSS REFERENCES TO RELATED APPLICATIONS

The present application claims priority to Japanese Priority Patent Application JP 2010-000424 filed in the Japan Patent Office on Jan. 5, 2010, the entire contents of which is hereby incorporated by reference.

BACKGROUND

The present application relates to a liquid crystal display device which can display in both an isotropic phase temperature range and a nematic phase temperature range, and a driving method of the same. More particularly, the present application relates to a liquid crystal display device having a wide operable temperature range, in which in an isotropic phase temperature range of a liquid crystal forming material, a display with high speed response can be performed using an induction and disappearance phenomenon of a nematic phase at the time of electric field application and non-application, and in a nematic phase temperature range, a display can be performed by using a change of orientation state of directors at the time of electric field application and non-application.

Hitherto, since a liquid crystal display device has features of light weight, low profile and low power consumption as compared with a CRT (Cathode Ray Tube), it is often used for display in an electronic equipment. When related art liquid crystal display devices are classified according to a method of applying an electric field to a liquid crystal layer, a vertical electric field system one and a lateral electric field system one are known. The liquid crystal display device of the vertical electric field system applies a substantially vertical electric field to liquid crystal molecules by a pair of electrodes disposed on both sides of a liquid crystal layer. As the liquid crystal display device of the vertical electric field system, the device of a TN (Twisted Nematic) mode, a STN (Super Twisted Nematic) mode, a VA (Vertical Alignment) mode, a MVA (Multi-domain Vertical Alignment) mode, an ECB (Electrically Controlled Birefringence) mode or the like is known.

In the liquid crystal display device of the lateral electric field system, a pair of electrodes insulated from each other are provided on the inner surface side of one of a pair of substrates disposed on both sides of a liquid crystal layer, and a substantially lateral electric field is applied to liquid crystal molecules. As the liquid crystal display device of the lateral electric field system, the device of an IPS (In-Plane Switching) mode in which the pair of electrodes are not overlapped with each other when viewed in a plane, and the device of an FFS (Fringe Field Switching) mode in which they are overlapped with each other are known.

In these related art liquid crystal display devices, the alignment direction of liquid crystal directors aligned in a specified direction is changed by the electric field, and the amount of light transmission is changed to display an image. The operation principle of the related art liquid crystal display device as stated above will be described with reference to FIGS. 7A to 7D.

Figures 7A, 7B, 7C:
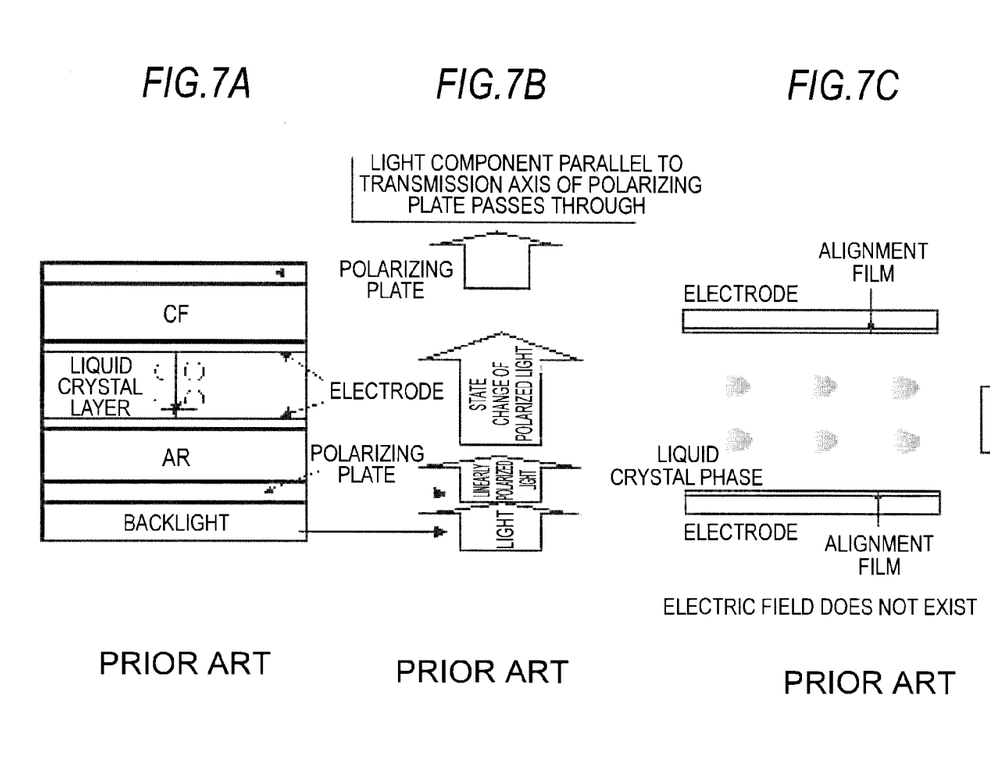
FIG. 7A is a schematic sectional view of a related art liquid crystal display device of vertical electric field system.
FIG. 7B is a view showing a light transmission state thereof.
FIG. 7C is a schematic view showing an orientation state of directors in an electric field non-application state.
Figure 7D:
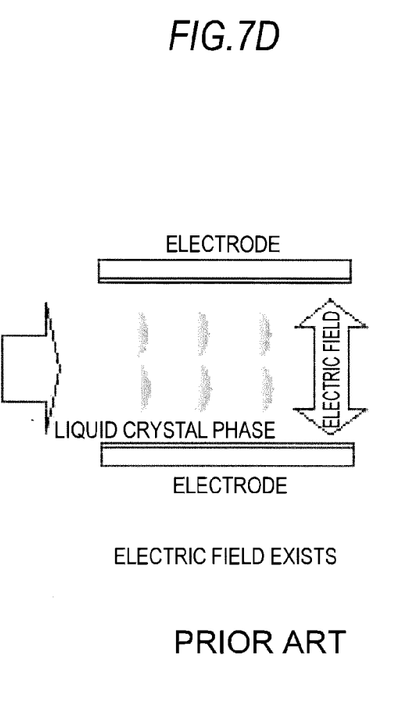
FIG. 7D is a schematic view showing an orientation state of the directors in an electric field application state.

FIG. 7A is a schematic sectional view of a related art liquid crystal display device of a vertical electric field system, which is a liquid crystal display device using, as an optical element, a change of optical phase difference occurring when an external electric field (voltage) is applied to a liquid crystal layer. FIG. 7B is a view showing a light transmission state in the liquid crystal display device. FIGS. 7C and 7D show orientation states of directors in the liquid crystal layer of the nematic liquid crystal layer having a positive dielectric constant anisotropy, and shows a voltage non-application state (FIG. 7C) and a voltage application state (FIG. 7D). Most related art liquid crystal display devices are used as the display devices by changing the orientation of directors of a liquid crystal, such as a nematic liquid crystal, at a temperature lower than transition temperature of nematic phase-isotropic phase.

As shown in FIG. 7A, in the related art liquid crystal display device, a liquid crystal layer is sandwiched between an array substrate AR and a color filter substrate CF, and a transparent electrode is formed on the liquid crystal layer side of each of the array substrate AR and the color filter substrate CF. A polarizing plate is disposed on the outer surface (opposite side to the liquid crystal layer) of each of the array substrate AR and the color filter CF, and a backlight light source is disposed on the outer surface of the polarizing plate on the array substrate AR side. As shown in FIG. 7B, light incident on the polarizing plate on the array substrate AR side from the backlight light source is converted into linearly polarized light, and a phase difference is given to the linearly polarized light when passing through the liquid crystal layer. Further, only the light parallel to the transmission axis of the polarizing plate on the color filter layer side passes through and is visually recognized.

The directors in the liquid crystal layer are aligned in, for example, a horizontal direction by the action of the alignment film formed on the surface of the transparent electrode in an electric field non-application state (see FIG. 7C), and is aligned in a vertical direction in an electric field application state (see FIG. 7D). As stated above, since the alignment state of the directors of the liquid crystal layer is changed between in the electric field non-application state and in the electric field application state, the phase of the light passing through the liquid crystal layer is changed. Thus, in the related art liquid crystal display device, the amount of light transmission is controlled by an interaction between the electric field formed by the pair of electrodes and the transmission axis of the polarizing plate, so that a specified image can be displayed.

Incidentally, in the liquid crystal display device of the lateral electric field system, although the pair of electrodes are formed on the array substrate AR, the device is not different from the liquid crystal display device of the vertical electric field system in that the amount of light transmission is controlled by an interaction between the electric field formed by the pair of electrodes and the transmission axis of the polarizing plate so that a specified image is displayed.

On the other hand, various compounds are known as the liquid crystal forming material. For example, 4-cyano-4' pentylbiphenyl) (hereinafter referred to as "5CB") expressed by the following chemical formula has a positive dielectric anisotropy, is solid at 24° C. or less, is liquid at 35° C. or higher, and exists in a liquid crystal state at a temperature between 24° C. to 35° C. That is, the 5CB performs a phase transition between a liquid crystal phase and a solid phase (isotropic phase temperature range) at about 35° C.

In the liquid crystal phase, the 5CB exists in the nematic phase. When the nematic phase is heated, a phase transition to the isotropic phase occurs discontinuously at about 35° C., and during that, there occurs a state (hereinafter referred to as a pseudo-isotropic phase) which is an isotropic phase optically and macroscopically, and microscopically indicates a nematic phase property.

Although the temperature range in which the pseudo-isotropic phase appears is about 1K and is very narrow, Non-patent document 1 listed below discloses that excellent electro-optical effects occurs as follows:

(1) when a polymer network is stretched in the nematic phase in which a chiral agent is mixed, the pseudo-isotropic phase in the case of no electric field macroscopically becomes the isotropic phase in a wide temperature range by the polymer network with random structure, (2) when an electric field is applied, since dielectric anisotropy occurs in the pseudo-isotropic phase by electro-optical Kerr effect, optical anisotropy occurs, and when the electric field is removed, the state is quickly returned to the original state, and (3) the response time at the time of electric field application-removal is an order of 10 μsec, and is very high when consideration is given to a fact that the response speed when the alignment direction of the related art nematic phase is changed is several msec or more.

Besides, Non-patent document 1 discloses that when the polymer network is stretched in a blue phase appearing in a narrow region between the chiral nematic phase and the isotropic phase, excellent electro-optical effects are obtained as follows:

(4) the inducing temperature range of the blue phase widens to 100 K or more, (5) when an electric field is applied to the blue phase, a birefringent phenomenon appears by the electro-optical Kerr effect, and when the electric field is removed, the birefringent phenomenon disappears, and (6) with respect to the response speed at the time of electric field application-removal, both a rising time and a fall time are 10 to 100 μsec, and is very higher than the response speed when the alignment direction of the related art nematic phase is changed.

Examples of the related art includes JP-A-11-183937 (Patent document 1), JP-A-20001-265298 (Patent document 2), JP-A-2007-323046 (Patent document 3) and Liquid Crystal, vol. 9, No. 2 (2006), pp. 83 to 95 (Non-Patent document 1).

SUMMARY

When the electro-optical effect in the pseudo-isotropic phase of the polymer stabilized state and the polymer stabilized blue phase is used, an electro-optical element having high response speed can be formed. However, in both, it is necessary to stretch the polymer network in the liquid crystal forming material. The polymer network can be formed by adding a polymer network forming monomer and a polymerization initiator into a specified liquid crystal forming material, by injecting it between the array substrate and the color filter substrate, and then by irradiating ultraviolet rays to perform polymerization. However, since the polymer network formation process as stated above is not adopted in the formation process of the related art liquid crystal display device, the process is an extraneous process and is difficult to immediately introduce.

In addition, in most related art electro-optical elements using the electro-optical effect in the pseudo-isotropic phase of the polymer stabilized state and in the polymer stabilized blue phase, it is not considered that the characteristic is changed by the intensity of an applied electric field and it is assumed that only the on and off characteristic of the electro-optical element is used. For example, the above Patent Document 1 discloses an optical switch element or an electro-optical switch element, such as a color shutter, using the induction phenomenon of the Kerr effect when voltage is applied to a liquid crystal forming material in an isotropic phase state divided into small sections by a reticulated polymer or the like.

On the other hand, the present inventor examines a liquid crystal display device in which in the display device using the phase transition phenomenon between the nematic phase and the isotropic phase of the liquid crystal forming material as stated above, the amount of transmission light for halftone can be arbitrarily extracted. As a result, also in the display device using the phase transition phenomenon between the nematic phase and the isotropic phase of the liquid crystal forming material, it is confirmed that the liquid crystal display device is obtained in which halftone display is possible, and high response speed can be achieved. However, this liquid crystal display device has problems that the operable temperature range is narrow, the drive signal voltage is high, and the response speed at the time of halftone display is low. Accordingly, in the liquid crystal display device using the phase transition phenomenon between the nematic phase and the isotropic phase, it is necessary to widen the operable temperature range, to reduce the drive signal voltage, and to achieve the high speed response at the time of halftone display.

The present inventor found that in the display device using the phase transition phenomenon between the nematic phase and the isotropic phase of the liquid crystal forming material, the displayable temperature range could be widened by adopting the same driving method as that of a normal liquid crystal display panel in at least the nematic phase temperature range, and completed the present application.

That is, it is desirable to provide a liquid crystal display device with a wide operable temperature range and a driving method of the same, in which in a display device using a phase transition phenomenon between a nematic phase and an isotropic phase of a liquid crystal forming material, a high response speed display can be performed using an induction and disappearance phenomenon of the nematic phase at the time of electric field application and non-application in an isotropic phase temperature range of the liquid crystal forming material, and a display can be performed using a change of orientation state of directors at the time of electric field application and non-application in a nematic phase temperature range.

According to an embodiment, there is provided a liquid crystal display device including a first substrate and a second substrate between which a liquid crystal forming material is sandwiched and which are disposed to be opposite to each other, a pair of electrodes including one electrode and the other electrode, a control means for controlling a voltage applied between the pair of electrodes, and a temperature detector, in which the control means applies a voltage, by which a change of light transmittance occurs based on an induction and disappearance phenomenon of a nematic phase in the liquid crystal forming material, between the pair of electrodes when a temperature of the liquid crystal forming material detected by the temperature detector is in an isotropic phase temperature range, and the control means applies a voltage, by which a change of light transmittance occurs based on a change of orientation of directors of the liquid crystal forming material, between the pair of electrodes when the temperature of the liquid crystal forming material detected by the temperature detector is in a nematic phase temperature range.

The liquid crystal forming material becomes solid at a low temperature, becomes liquid (isotropic phase) at a high temperature, and becomes liquid crystal (nematic phase) at a temperature between both. A phase transition occurs between the isotropic phase and the nematic phase at a temperature (phase transition temperature) determined according to the liquid crystal forming material. In the isotropic phase temperature range of the liquid crystal forming material, the liquid crystal display device of the embodiment uses the change of the light transmittance based on the induction and disappearance phenomenon of the nematic phase in the liquid crystal forming material of the isotropic phase according to the voltage applied between the pair of electrodes. That is, in the isotropic phase temperature range, when voltage is not applied between the pair of electrodes, the liquid crystal forming material remains in the isotropic phase. However, when a specified voltage (voltage not lower than a threshold voltage to induce the phase transition between the nematic phase and the isotropic phase) is applied between the pair of electrodes, the liquid crystal forming material in the isotropic phase transitions to the nematic phase, and the nematic phase disappears when the voltage applied between the pair of electrodes is removed and returns to the original isotropic phase.

When the liquid crystal forming material is in the isotropic phase, since the optical phase change does not occur, the transmittance depends on a condition determined by the pair of polarizing plates. On the other hand, in the isotropic phase temperature range of the liquid crystal forming material, when the phase of the liquid crystal forming material changes from the isotropic phase to the nematic phase by the voltage applied between the pair of electrodes, the electro-optical effect occurs. Thus, a phase change occurs in the light passing through the liquid crystal forming material, and the transmittance is changed. Since the induction and disappearance speed of the nematic phase in the isotropic phase temperature range of the liquid crystal forming material is greatly higher than the realignment speed of the directors in the nematic phase temperature range of the related art liquid crystal forming material, the liquid crystal display device with high response speed can be obtained.

Besides, in the liquid crystal display device of the embodiment, in the nematic phase temperature range of the liquid crystal forming material, the voltage by which the change of light transmittance occurs based on the change of orientation of the liquid crystal directors is applied between the pair of electrodes. Since the operation at this time is similar to that of the case of the related art liquid crystal display device, an excellent display image quality can be obtained.

That is, the liquid crystal display device of the embodiment can realize the liquid crystal display device having two different characteristics, that is, the liquid crystal display device using the isotropic phase temperature range and the liquid crystal display device using the nematic phase temperature range by one liquid crystal display device. This enables realization of various use methods, and for example, the liquid crystal display device is properly used according to the usage or the environment.

Incidentally, since the temperature detector used in the liquid crystal display device of the embodiment is for detecting the temperature on the liquid crystal forming material side, it is desirable to form the detector on the liquid crystal forming material side of the first substrate or the second substrate, and it is more preferable to form a thin film type one. The temperature detector can be formed using a thermistor forming material, semiconductor material, metal material or the like.

Besides, in the liquid crystal display device of the embodiment, it is preferable that the control means applies the voltage having an amplitude, which is larger than that of the applied voltage in the nematic phase temperature range of the liquid crystal forming material, between the pair of electrodes in the isotropic phase temperature range of the liquid crystal forming material.

In the nematic phase temperature range of the liquid crystal forming material, the liquid crystal display device of the embodiment can change the light transmittance based on the change of orientation of the liquid crystal directors by the same applied voltage as the voltage applied between the pair of electrodes in the related art liquid crystal display device. On the other hand, in order to change the isotropic phase to the nematic phase in the isotropic phase temperature range of the liquid crystal forming material, it is necessary to apply the voltage not lower than the threshold voltage to induce the phase transition between the nematic phase and the isotropic phase. The threshold voltage to induce the phase transition between the nematic phase and the isotropic phase is greatly larger than the voltage applied between the pair of electrodes.

In the liquid crystal display device of the embodiment, since the voltage applied between the pair of electrodes in the isotropic phase temperature range and the nematic phase temperature range of the liquid crystal forming material can be automatically changed by the control means, it is possible to easily change the operation mode in the nematic phase temperature range and the isotropic phase temperature range of the liquid crystal forming material.

Besides, in the liquid crystal display device of the embodiment, it is preferable that a polarizing plate is disposed on the outer surface side of each of the first substrate and the second substrate.

In the isotropic phase temperature range of the liquid crystal forming material, although the polarization characteristic of light passing through the liquid crystal forming material is not changed at the time of voltage non-application, it is changed at the time of voltage application. Besides, in the nematic phase temperature range of the liquid crystal forming material, the polarization characteristic of light passing through the liquid crystal forming material is changed at both the time of voltage non-application and the time of voltage application. Thus, when the polarizing plate is provided on the outer surface side of each of the first substrate and the second substrate, by the arrangement of the optical transmission axes of the polarizing plates, in both the isotropic phase temperature range and the nematic phase temperature range of the liquid crystal forming material, the operation can be arbitrarily performed in a normally black mode or a normally white mode.

Besides, in the liquid crystal display device of the embodiment, it is preferable that an alignment film is formed on an interface of each of the first substrate and the second substrate to the liquid crystal forming material.

In the isotropic phase temperature range of the liquid crystal forming material, when the alignment film is not formed, as the temperature rises, the threshold voltage to induce the phase transition between the nematic phase and the isotropic phase rises. However, when the alignment film is formed, a high voltage shift of the threshold voltage to induce the phase transition between nematic phase and the isotropic phase due to the temperature rise is suppressed, and the operable temperature range is widened. Incidentally, in the nematic phase temperature range of the liquid crystal forming material, when the alignment film is formed, an abnormal alignment region of directors is hard to occur. Thus, according to the liquid crystal display device of the embodiment, as compared with the case where the alignment film is not formed, in the isotropic phase temperature range of the liquid crystal forming material, even if the temperature rise occurs, the increase of the applied voltage is suppressed, and the operable temperature range is widened, and a display image quality becomes excellent in the nematic phase temperature range of the liquid crystal forming material.

Besides, in the liquid crystal display device of the embodiment, the one electrode of the pair of electrodes is formed on the first substrate, and the other electrode is formed on the second substrate.

In the related art liquid crystal display device, the pair of electrodes are formed on the first substrate and the second substrate in the liquid crystal display device of a vertical electric field system such as a TN mode, an STN mode, a VA mode or an ECB mode. The embodiment can be applied as the liquid crystal display device of the vertical electric field system when the system is not the system in which the directors are twisted in the liquid crystal layer, such as the TN mode or the STN mode. In this case, various combinations are possible according to whether the dielectric anisotropy of the liquid crystal is positive or negative, whether the operation is performed only in the isotropic phase temperature range of the liquid crystal forming material, whether the operation is performed only in the nematic phase temperature range of the liquid crystal forming material, or whether switching operation is performed in the isotropic phase temperature range and the nematic phase temperature range of the liquid crystal forming material.

Besides, in the liquid crystal display device of the embodiment, the pair of electrodes are formed on the first substrate.

In the related art liquid crystal display device, the pair of electrodes are formed on only one of the first substrate and the second substrate in the liquid crystal display device of a lateral electric field system such as an IPS mode or an FFS mode. The application can also be applied as the liquid crystal display device of the lateral electric field system.

Besides, the liquid crystal display device of the embodiment further includes a temperature control device, and the control device drives the temperature control device, and performs selective driving to achieve the isotropic phase temperature range of the liquid crystal forming material or the nematic phase temperature range of the liquid crystal forming material.

When the liquid crystal display device includes the temperature control device, irrespective of the outer temperature, the temperature of the liquid crystal display device can be kept in the isotropic phase temperature range or the nematic phase temperature range of the liquid crystal forming material. Thus, irrespective of the outer temperature, the liquid crystal display device of the embodiment can be selectively operated in the isotropic phase temperature range or the nematic phase temperature range of the liquid crystal forming material. Incidentally, as the temperature control device, a well-known one, such as an electric heating and cooling unit or a device in which a heating and cooling medium is circulated, can be suitably selected and used.

Besides, in the liquid crystal display device of the embodiment, it is preferable that the temperature control device is a peltiert element.

The peltiert element can switch between heating and cooling by the direction of flow current. Thus, irrespective of the outer temperature, the liquid crystal display device of the embodiment can be easily selectively operated in the isotropic phase temperature range or the nematic phase temperature range of the liquid crystal forming material.

Further, according to another embodiment, there is provided a driving method of a liquid crystal display device including a first substrate and a second substrate between which a liquid crystal forming material is sandwiched and which are disposed to be opposite to each other, and a pair of electrodes formed on the liquid crystal forming material side of at least one of the first substrate and the second substrate, in which the driving method of the liquid crystal display device includes the steps of:

displaying by using a change of light transmittance based on an induction and disappearance phenomenon of a nematic phase in the liquid crystal forming material according to a voltage applied between the pair of electrodes when a temperature of the liquid crystal forming material of the liquid crystal display device is in an isotropic phase temperature range, and displaying by using a change of light transmittance based on a change of orientation of directors of the liquid crystal forming material according to a voltage applied between the pair of electrodes when the temperature of the liquid crystal forming material of the liquid crystal display device is in a nematic phase temperature range.

According to the driving method of the liquid crystal display device of the embodiment, according to the temperature of the liquid crystal display device, the display mode using the change of light transmittance based on the induction and disappearance phenomenon of the nematic phase in the liquid crystal forming material according to the voltage applied between the pair of electrodes and the display mode using the change of light transmittance based on the change of orientation of the directors of the liquid crystal according to the voltage applied between the pair of electrodes can be switched and driven.

Besides, in the driving method of the liquid crystal display device of the embodiment, when the temperature of the liquid crystal forming material of the liquid crystal display device is in the isotropic phase temperature range, the applied voltage at least when a halftone display using the light transmittance is performed includes a pulse voltage whose amplitude is larger than that of a voltage corresponding to the halftone display.

According to the driving method of the liquid crystal display device of the embodiment, although the driving method is simple, even in the display mode using the change of the light transmittance based on the induction and disappearance phenomenon of the nematic phase in the liquid crystal forming material of the isotropic phase in which the response speed is low at the time of the halftone display, the response speed can be improved.

Besides, in the driving method of the liquid crystal display device of the embodiment, when the halftone display using the light transmittance is performed, the voltage applied between the pair of electrodes is binary-driven, and the number of turned-on sub-pixels of a specific color is controlled for every plural pixels including sub-pixels of plural colors.

Also in the driving method of the liquid crystal display device of the embodiment, it is necessary to sacrifice improvement in fineness. However, although the driving method is simple, the response speed can be improved also in the display mode using the change of light transmittance based on the induction and disappearance phenomenon of the nematic phase in the liquid crystal forming material of the isotropic phase in which the response speed at the time of halftone display is low.

Additional features and advantages are described herein, and will be apparent from the following Detailed Description and the figures.

DETAILED DESCRIPTION

Embodiments of the present application will be described below in detail with reference to the drawings.

Hereinafter, embodiments will be described with reference to the drawings. However, the embodiments described below are not intended to limit the application, and the application can be applied to various modifications without departing from the technical concept disclosed in the appended claims. Incidentally, in the respective drawings used for the description in the specification, respective layers and respective members are displayed in different scales in order to cause the respective layers and the respective members to have recognizable sizes on the drawings, and they are and are not necessarily displayed in proportion to the actual sizes.

Incidentally, since liquid crystal display devices of the respective embodiments described below are for confirming the operation principal of the application, only a transparent overcoat layer is formed as a color filter layer of a color filter substrate CF. A liquid crystal forming material used in the liquid crystal display devices of the respective embodiments is 5CB expressed by the following chemical formula. The 5CB performs a phase transition at about 35° C. between a liquid crystal (nematic phase) phase and a liquid phase (isotropic phase).

Figure 1A:
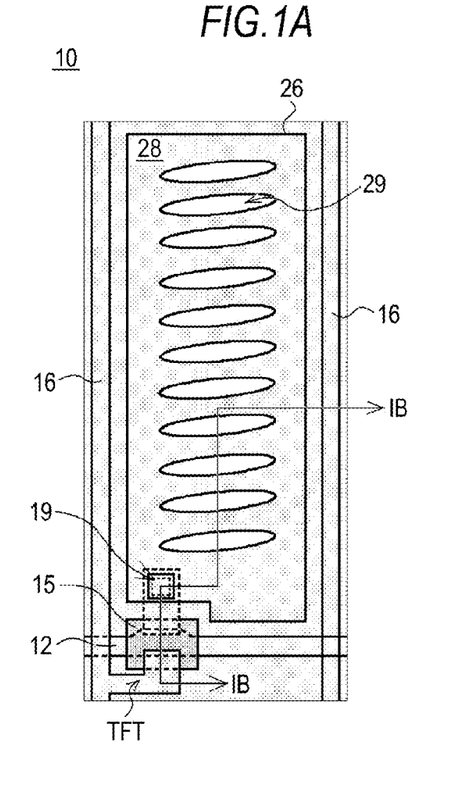
FIG. 1A is a plan view showing the outline of an array substrate for a pixel in a liquid crystal display panel common to respective embodiments.
Figure 1B:
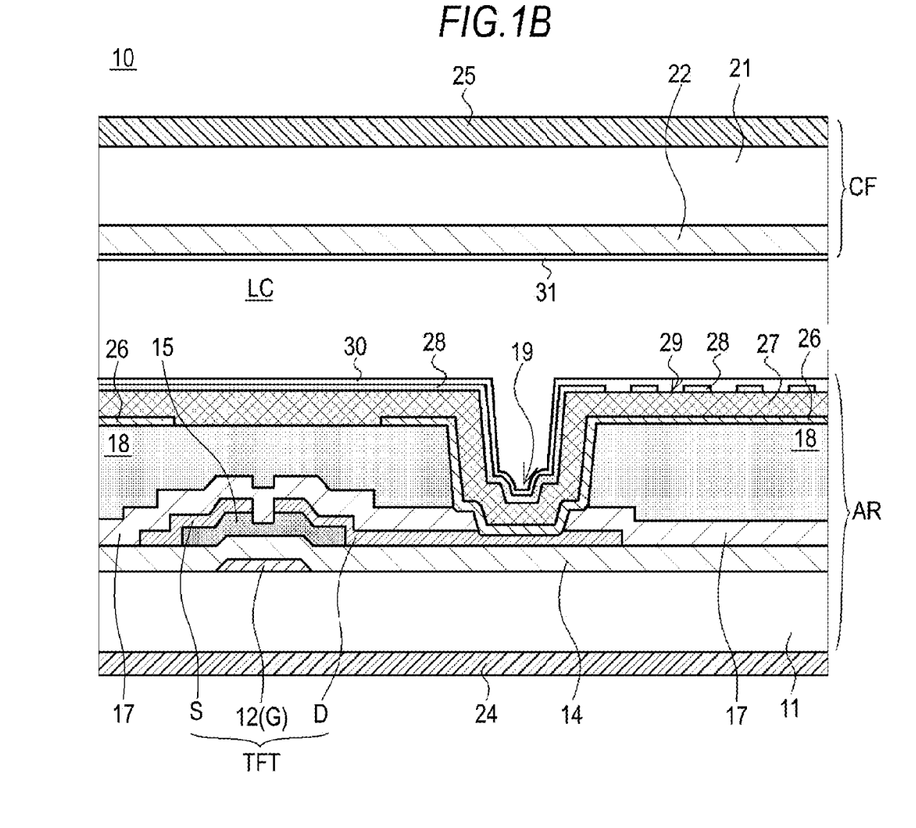
FIG. 1B is a sectional view along line 1B-1B of FIG. 1A.

A structure of a liquid crystal display panel 10 of a liquid crystal display device 10A of a first embodiment will be described with reference to FIGS. 1A and 1B. FIG. 1A is a plan view showing the outline of an array substrate for a pixel in the liquid crystal display panel 10 of an FFS mode according to the first embodiment, and FIG. 1B is a sectional view along line 1B-1B of FIG. 1A. As shown in FIG. 1B, the liquid crystal display panel 10 of the first embodiment has the structure in which a liquid crystal forming material LC is sealed between an array substrate AR and a color filter substrate CF disposed to be opposite to each other. The array substrate AR corresponds to a first substrate in an embodiment, and the color filter substrate CF corresponds to a second substrate.

In the array substrate AR, plural scanning lines 12 made of metal such as aluminum or molybdenum are formed in parallel at equal intervals on a surface of a first transparent substrate 11 made of transparent glass or the like having an insulating property. The scanning line 12 is formed to be partially wide at a formation schedule position of a gate electrode G of a TFT. Further, a transparent gate insulating film 14 made of silicon nitride or silicon oxide is laminated so as to cover an exposed portion of the scanning lines 12 and the glass substrate 11. A semiconductor layer 15 made of amorphous silicon or polycrystalline silicon is formed on the gate insulating film 14 overlapping with the gate electrode G when viewed in a plane. Besides, plural signal liens 16 made of metal such as aluminum or molybdenum are formed on the gate insulating film 14 so as to intersect the scanning lines 12. A source electrode S of the TFT is extended from the signal line 16, and the source electrode S partially contacts with the surface of the semiconductor layer 15.

Further, a drain electrode D made of the same material as the signal line 16 and the source electrode S and formed simultaneously with them is provided on the gate insulating film 14. The drain electrode D is disposed near the source electrode S and partially contacts with the semiconductor layer 15. An area surrounded by the scanning line 12 and the signal line 16 corresponds to one sub-pixel region. The TFT as a switching element includes the gate electrode G, the gate insulating film 14, the semiconductor layer 15, the source electrode S and the drain electrode D, and this TFT is formed in each of the sub-pixels.

Further, a transparent passivation film 17 made of, for example, silicon nitride or silicon oxide is laminated so as to cover an exposed portion of the signal line 16, the TFT and the gate insulating film 14. An interlayer film 18 made of a transparent resin material such as, for example, photoresist is laminated so as to cover the passivation film 17. A lower electrode 26 made of transparent conductive material such as ITO or IZO is formed so as to cover the interlayer film 18. A contact hole 19 passing through the interlayer film 18 and the passivation film 17 and reaching the drain electrode D is formed. The lower electrode 26 and the drain electrode D are electrically connected to each other through the contact hole 19. Thus, in this liquid crystal display panel 10, the lower electrode 26 operates as a pixel electrode.

A transparent inter-electrode insulating film 27 made of, for example, silicon nitride or silicon oxide is laminated so as to cover the lower electrode 26. An upper electrode 28 made of transparent conductive material, such as ITO or IZO, is formed so as to cover the inter-electrode insulating film 27. As shown in FIG. 1, plural slit-like openings 29 are formed in the upper electrode 28. The upper electrode 28 is electrically connected to a common wiring (not shown) in a frame region of a peripheral part of a display region. Thus, in this liquid crystal display panel 10, the upper electrode 28 operates as a common electrode.

The slit-like opening 29 has, for example, an oblong shape, and the longitudinal direction thereof is inclined rightward and upward by about 5 degrees with respect to the extension direction of the scanning direction. An alignment film 30 is formed on the surface of the upper electrode 28 and on the inner surface of the slit-like opening 29. The structure of the array substrate AR of the liquid crystal display panel 10 of the first embodiment has the same structure as an array substrate in a related art liquid crystal display device of FFS mode.

Besides, in the color filter substrate CF, a transparent overcoat layer 22 instead of a color filter is provided on the surface of a second transparent substrate 21 made of transparent glass or the like having an insulation property. An alignment film 31 is formed on the surface of the overcoat layer 22.

The array substrate AR and the color filter substrate CF formed as described above are made opposite to each other, a sealing material is provided around both the substrates to bond the substrates, and the foregoing liquid crystal forming material is injected between both the substrates. Thereafter, a first polarizing plate 24 is disposed on the rear surface side of the array substrate AR, and a second polarizing plate 25 is disposed on the rear surface side of the color filter substrate CF. Both the polarizing plates are disposed in crossed Nicols, so that the lateral electric field system liquid crystal display panel 10 of the first embodiment operating in the FFS mode is obtained. Incidentally, a cell gap of the liquid crystal display panel 10 is about 3 µm, and the width of a portion sandwiched between the slit-like openings 29 of the upper electrode 28 and the width of a portion of the slit-like opening 29 are both about 2.5 µm.

Figure 2A:
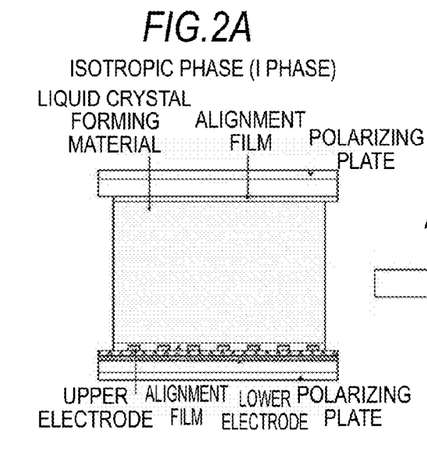
FIG. 2A is a schematic view showing a state of a liquid crystal forming material in an isotropic phase temperature range of the liquid crystal display panel common to the respective embodiments.
Figure 2B:
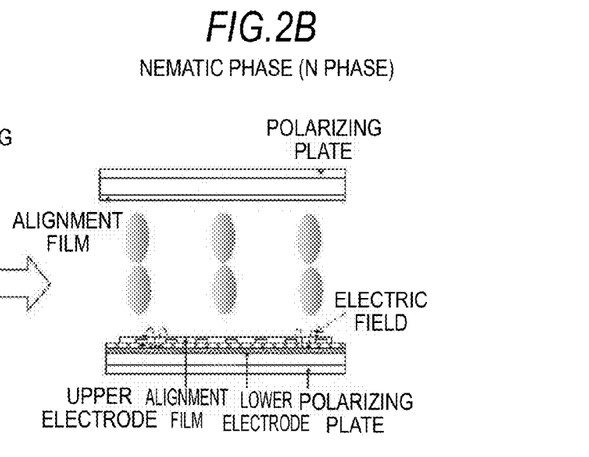
FIG. 2B is a schematic view showing an orientation state of directors induced when an electric field is applied.

Here, the operation principle of the liquid crystal forming material of the liquid crystal display panel 10 of the first embodiment in the isotropic phase temperature range will be described with reference to FIGS. 2A and 2B. FIG. 2A is a schematic view showing a state of the liquid crystal forming material of the liquid crystal display panel 10 of the first embodiment in the isotropic phase temperature range, and FIG. 2B is a schematic view showing an orientation state of directors induced when an electric field is applied.

As shown in FIG. 2A, in the isotropic phase temperature range, since the liquid crystal forming material exists in the isotropic phase (liquid), light passing through the liquid crystal forming material is not influenced. Thus, since the pair of polarizing plates are disposed in crossed Nicols, the light passing though the one polarizing plate and converted into linearly polarized light can not pass through the other polarizing plate. However, when a voltage is applied between the pair of electrodes and electric field is applied to the liquid crystal forming material, as shown in FIG. 2B, the nematic phase is induced. Since the phase of the light passing through the nematic phase is changed by electro-optical Kerr effect, the phase of the light passing through the one polarizing plate and converted into the linearly polarized light is changed while passing through the nematic phase. Thus, the light can pass through the other polarizing plate.

In this case, when the phase of the incident light is not changed by the liquid crystal forming material, since the light passing through the first polarizing plate 24 can not pass through the second polarizing plate 25 (see FIG. 1B), a normally black liquid crystal display device is obtained.

Measurement of V-T Curve

In order to confirm the operation characteristic of the liquid crystal display panel 10 prepared as stated above, the following measurement is performed. Incidentally, with respect to measuring apparatuses at this time, LCD7000 made by Otsuka Electronic Co., Ltd. is used as an optical measuring apparatus, and AP529E made by Anritsu Meter Co., Ltd. is used as a temperature monitoring apparatus. Besides, with respect to the light transmittance, under crossed Nicols condition, incident light inclined by 45° relative to the normal of the cell substrate surface is directly measured in the outgoing direction. Incidentally, in the following, the transition temperature (35° C.) between the nematic phase and the isotropic phase in the used liquid crystal forming material is denoted by $T_{NI}$.

Figure 3A:
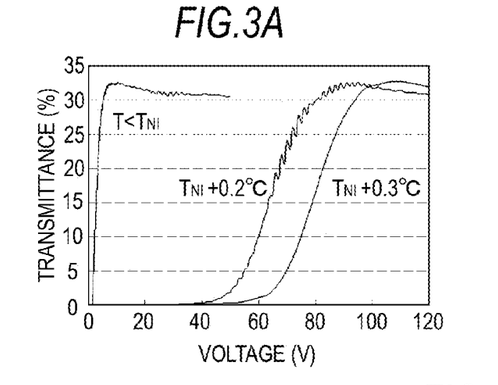
FIG. 3A is a graph showing a relation (V-T curve) between a voltage applied between electrodes and a transmittance at each temperature.
Figure 3B:
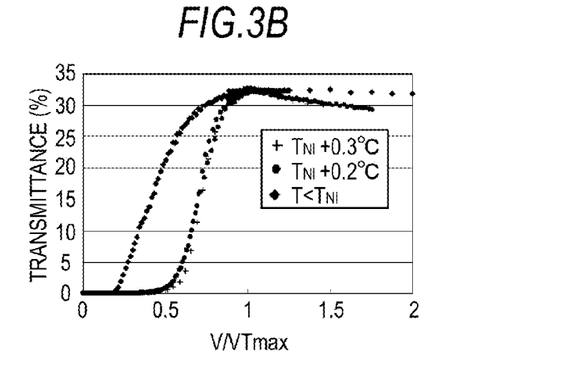
FIG. 3B is a graph in which measurement results of FIG. 3A are normalized by a voltage at the maximum value Tmax of the transmittance.

The liquid crystal display panel 10 of the first embodiment is placed in a constant-temperature bath while temperature T is kept at three points of 34.7° C. lower than $T_{NI}$, $T_{NI}$+0.2° C. and $T_{NI}$+0.3° C., and the obtained result concerning the relation (V-T curve) between the voltage applied between the pair of electrodes and the light transmittance at each of the temperatures is shown in FIG. 3A. FIG. 3B shows the result obtained by normalizing the measurement result of FIG. 3A by the voltage at the maximum value Tmax of the light transmittance.

The liquid crystal forming material 5CB used here exists in the nematic phase at 34.7° C., since the temperature is lower than the phase transition temperature $T_{NI}$ between the nematic phase and the isotropic phase, and is the temperature at which the material is not solidified. According to the result shown in FIG. 3A, it is confirmed that at 34.7° C., the material has the same electro-optical effect as the nematic phase liquid crystal of the normal liquid crystal display device of lateral electric field system. Besides, at $T_{NI}$+0.2° C. and $T_{NI}$+0.3° C., since the state of the light transmittance=0 is observed at the time of voltage non-application, it is confirmed that the material exists in the isotropic phase. Further, when the application voltage range is 40 V or higher, since the light transmittance rises, the induction phenomenon of the nematic phase is observed.

Besides, according to the result obtained by normalization using the voltage at the maximum value Tmax of the light transmittance, although the required threshold voltages are different, and there is a slight shift in the light transmittance (shift in gradation), the tendency of the T-V curve is the same between the case where the temperature T is lower than $T_{NI}$ and the case where the temperature exceeds $T_{N1}$. This means that since the drive signal voltage applied between the pixel electrode (lower electrode) and the common electrode (upper electrode) of the liquid crystal display device can be suitably changed in view of digital drive technology or overdrive technology, driving can be performed by the same driving unit in both the case of $T<T_{N1}$ and the case of $T>T_{N1}$.

First Embodiment

Figure 4:
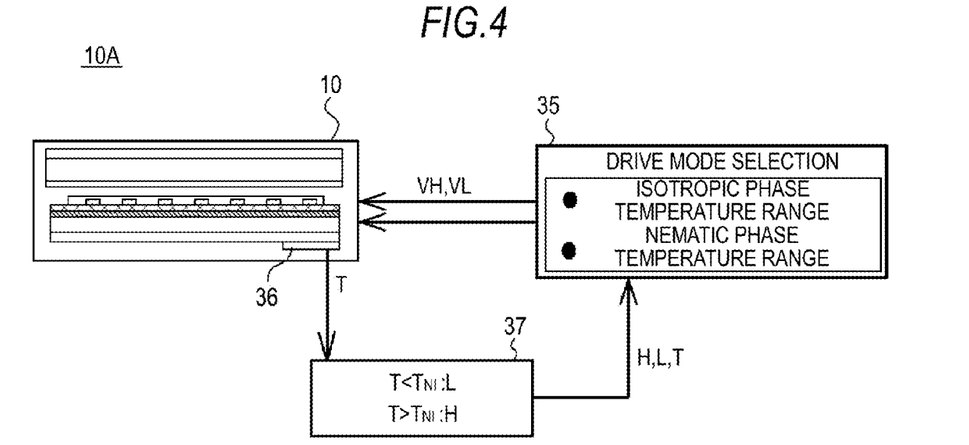
FIG. 4 is a block diagram showing a liquid crystal display device of a first embodiment.

The liquid crystal display device 10A of the first embodiment can be operated by combining the foregoing liquid crystal display panel 10 and a drive unit 35 having a structure shown in FIG. 4. Incidentally, FIG. 4 is a block diagram showing the liquid crystal display device 10A of the first embodiment. First, a temperature detector 36 is provided on the liquid crystal display panel 10. Since the temperature detector 36 is for detecting the temperature of the liquid crystal forming material, in order to detect the temperature with high accuracy, it is preferable to form the thin film type temperature detector on the liquid crystal forming material side of the array substrate AR or the color filter substrate CF by using a thermistor forming material, semiconductor material, metal material or the like.

Incidentally, although the temperature detector 36 is formed on the substrate surface positioned opposite to the liquid crystal forming material side, the detector may be formed on the liquid crystal forming material side. In that case, for example, the temperature detector may be formed on the surface of the array substrate AR simultaneously with components constituting the TFT. When the temperature detector is formed on the liquid crystal forming material side, it becomes possible to more accurately detect the temperature of the liquid crystal forming material.

Based on the output of the temperature detector 36, a temperature determination unit 37 is used to determine whether the temperature of the liquid crystal display panel 10, more accurately, the temperature T of the liquid crystal forming material is $T<T_{N1}$ or $T>T_{N1}$. When the temperature is, for example, $T<T_{N1}$, an output signal L is generated, and when the temperature is $T>T_{N1}$, an output signal H is generated. As the temperature determination unit 37, a well-known comparator circuit can be used. The temperature determination unit 37 sends the temperature signal T, together with the output signal L or H corresponding to the temperature T of $T<T_{N1}$ or $T>T_{N1}$, to the drive unit 35.

In the case where the liquid crystal display panel 10 is driven in binary of light and dark, when the output signal of the temperature determination unit 37 is L, since the temperature T is $T<T_{N1}$ and the liquid crystal forming material exists in the nematic phase, the drive unit 35 outputs the voltage signal of, for example, VH=10V and VL=0V based on FIG. 3A, and applies them to the lower electrode 26 and the upper electrode 28. Similarly, when the output signal from the temperature determination unit 37 is H, since the temperature T is $T>T_{N1}$ and the liquid crystal forming material exists in the isotropic phase, the voltages determined according to the measured temperature T, for example, the signals of VH=90V and VL=0V in the case of $T=T_{N1}+0.2°$ C. based on FIG. 3A or the signals of VH=100 V and VL=0 V in the case of $T=T_{N1}+0.3°$ C. are applied to the lower electrode 26 and the upper electrode 28. The relation between the temperature T and the applied voltage in this case can be easily selected by previously preparing a look-up table or the like.

As described above, according to the liquid crystal display device 10A of the first embodiment, when the temperature T of the liquid crystal forming material is T>TN1, high speed display using the phase transition between the isotropic phase and the nematic phase becomes possible by applying the voltage, the amplitude of which is larger than the voltage applied in the related art liquid crystal display device, to the liquid crystal display panel 10. Besides, when the temperature T of the liquid crystal forming material is T<TN1, driving using the reorientation of directors similar to the related art liquid crystal display device becomes possible. Incidentally, the liquid crystal display device 10A of the first embodiment can be operated as the normally black liquid crystal display device in the nematic phase temperature range based on the same operation principle as the normal liquid crystal display device of FFS mode.

Incidentally, in the liquid crystal display device 10A of the first embodiment, the example in which the color filter substrate CF is provided with the overcoat layer 22 instead of a color filter layer is described as the liquid crystal display panel 10. However, when color filter layers of various colors are provided like a normal liquid crystal display panel, the liquid crystal display device is obtained which can perform various color displays while the above effect is obtained.

Besides, in the liquid crystal display device 10A of the first embodiment, although the example is described in which the alignment films 30 and 31 are provided as the alignment control unit of the liquid crystal display panel 10, the alignment films 30 and 31 are not necessarily required. However, when the alignment films 30 and 31 are formed, in the nematic phase temperature range, a light leak caused by disturbance of alignment of liquid crystal molecules in the case where voltage is not applied between the lower electrode 26 and the upper electrode 28 is hard to occur. Besides, in the isotropic phase temperature range, the applied voltage for driving can be decreased. Incidentally, as the alignment control unit, in addition to the alignment film, for example, a method of forming roughness on the electrode surface, a method of forming macromolecule polymer on the electrode surface and causing the macromolecule polymer to be subjected to optical alignment, or a method of causing the electrode surface to be subjected to a rubbing process by a rubbing cloth can be used.

Besides, in the liquid crystal display device 10A of the first embodiment, although the example is described in which the polarizing plates 24 and 25 are provided on the liquid crystal display panel 10, the polarizing plates 24 and 25 are not necessarily required when light and dark display is simply performed. However, when the polarizing plates 24 and 25 are used, in both the isotropic phase temperature range and the nematic phase temperature range, driving can be selectively performed in the normally black mode or the normally white mode by suitably selecting the liquid crystal forming material and by suitably adjusting the light transmission axes of the polarizing plates 24 and 25. Further, as the need arises, driving can be performed in different modes in the isotropic phase temperature range and the nematic phase temperature range.

Besides, as the liquid crystal display device 10A of the first embodiment, although the example of the liquid crystal display panel 10 of FFS mode is described, also when a liquid crystal display panel of IPS mode is adopted, the same operation is performed. Further, in the liquid crystal display device 10A of the first embodiment, although the material having the positive dielectric constant anisotropy is used as the liquid crystal forming material of the liquid crystal display panel 10, a liquid crystal forming material having a negative dielectric constant anisotropy may be used. In this case, it is preferable that the direction of the directors of the liquid crystal layer induced by the electric field is equal to the direction of the interface aligning process.

Further, in the liquid crystal display device 10A of the first embodiment, when a system is other than a system, such as a TN mode or an STN mode, in which directors are twisted in the liquid crystal layer, the liquid crystal display device of vertical electric field system can also be operated by combination of the dielectric constant anisotropy (positive or negative) of the liquid crystal forming material. The restriction as stated above occurs in the liquid crystal display device using the induction and disappearance phenomenon of the nematic phase in the isotropic phase temperature range.

That is, the related art liquid crystal display device uses one polarization condition, a combination of ordered structures in the liquid crystal layer at the time of voltage non-application, and an optical characteristic change by voltage application. In this case, the method of using the optical characteristic change of the liquid crystal display device is roughly divided into the following three types:

(1) using a change from a state having a finite phase difference to a state having a different finite phase difference, (2) using a change from a state where a phase difference does not occur to a state having a finite phase difference, and (3) using a state from a state having a finite phase difference to a state where a phase difference does not occur.

Although not strict, as typical modes, the above (1) includes an STN mode, a TN mode and the like, and the above (2) and (3) include an ECB mode, a VA mode, an IPS mode and an FFS mode. Besides, the condition from the polarizing plate includes a combination of a normally black (crossed Nicols) mode and a normally white (parallel Nicols) mode.

On the other hand, when the induction and disappearance phenomenon of the nematic phase in the isotropic phase temperature range is used in the display device, since the state is such that there is no phase difference or the phase difference does not occur in the liquid crystal layer at the time of voltage non-application, the display mode is determined by the condition (normally black (crossed Nicols) mode and normally white (parallel Nicols) mode) from the polarizing plate. Thus, when display is performed using the change of orientation state of directors in the nematic phase temperature range, in order to actuate in the same mode as the case where the induction and disappearance phenomenon of the nematic phase in the isotropic phase temperature range is used, the display mode is determined by the applied voltage and the positive or negative of the dielectric constant anisotropy of the liquid crystal forming material, and becomes as indicated in the combinations of Table 1.

TABLE 1

| Dielectric constant anisotropy | Isotropic phase temperature range | | Nematic phase temperature range | |
|---|---|---|---|---|
| | positive | negative | positive | negative |
| VA | x | ○ | x | ○ |
| ECB | x | ○ | ○ | x |
| IPS, FFS | ○ | ○ | ○ | ○ |

Second Embodiment

Figure 5:
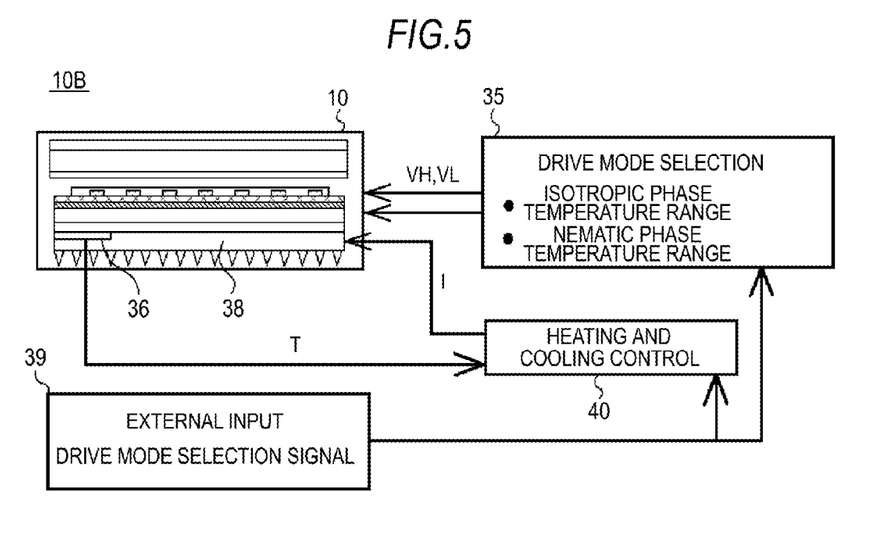
FIG. 5 is a block diagram showing a liquid crystal display device of a second embodiment.

In the liquid crystal display device 10A of the first embodiment, the example is described in which as shown in FIG. 4, the drive mode in the isotropic phase temperature range and the nematic phase temperature range is changed according to the temperature of the liquid crystal forming material of the liquid crystal display panel 10. In a liquid crystal display device 10B of a second embodiment, the drive mode in the isotropic phase temperature range and the nematic phase temperature range of the liquid crystal display panel 10 can be selected by an external input. The structure of the liquid crystal display device 10B of the second embodiment will be described with reference to FIG. 5. Incidentally, FIG. 5 is a block diagram showing a connection relation between the liquid crystal display device of the second embodiment and a drive unit. Since the liquid crystal display panel 10 of the liquid crystal display device 10B of the second embodiment has the same structure as the liquid crystal display panel 10 of the liquid crystal display device 10A of the first embodiment, its detailed description will be omitted.

The liquid crystal display panel 10 of the second embodiment includes a temperature detector 36 and a heating and cooling unit made of, for example, a peltiert element 38. The peltiert element 38 is an element in which a surface on one side is controlled to be placed in a heat generating state or a heat absorbing state by the direction of a flowing DC current. In the liquid crystal display panel 10 of the second embodiment, the peltiert element 38 can be disposed to contact with the back side of a light guide plate of a not-shown side-light type backlight light source. The temperature detector 36 may be formed similarly to the case of the liquid crystal display panel 10 of the first embodiment.

The liquid crystal display device 10B of the second embodiment includes an input unit 39, a heating and cooling control unit 40 and a drive unit 35. The input unit 39 is the unit configured to select, from the outside, whether high speed display is performed in the isotropic phase temperature range or whether the same display as the related art liquid crystal display device is performed in the nematic phase temperature range. The heating and cooling control unit 40 is the unit configured to control supply current I to the peltiert element 38 by the signal from the temperature detector 36 and the input unit 39 and to control the temperature to a desired constant temperature. Further, the drive unit 35 is the unit configured to control applied voltages VH and VL to a pixel electrode and a common electrode of the liquid crystal display device 10B.

When the state where display is performed in the isotropic phase temperature range is selected by the input unit 39, the selection signal is inputted to the heating and cooling control unit 40, and the heating and cooling control unit 40 controls the supply current I to the peltiert element 38 based on the temperature signal T from the temperature detector 36, so that the temperature becomes a desired temperature in the isotropic phase temperature range, for example, T=TN1+0.2° C. At the same time, the selection signal from the input unit 39 is supplied to the drive unit 35, and when the liquid crystal display panel 10 is driven in binary of light and dark, the drive unit 35 applies the signal of, for example, VH=90 V and VL=0 V to the pixel electrode and the common electrode.

Besides, when the input unit 39 selects the state where display is performed in the nematic phase temperature range, the selection signal is inputted to the heating and cooling control unit 40, and the heating and cooling control unit 40 controls the supply current I to the peltiert element 38 based on the temperature signal T from the temperature detector 36, so that the temperature becomes a desired temperature in the nematic phase temperature range, for example, T=30° C. At the same time, the selection signal from the input unit 39 is supplied to the drive unit 35, and when the liquid crystal display panel 10 is driven in binary of light and dark, the drive unit 35 applies the signal of, for example, VH=10 V and VL=0 V to the pixel electrode and the common electrode.

As described above, according to the liquid crystal display device 10B of the second embodiment, the temperature of the liquid crystal display panel 10 is controlled according to the state selected by the input unit 39, and the corresponding specified drive signal voltage is supplied to the pixel electrode and the common electrode. Thus, according to the liquid crystal display device 10A of the second embodiment, the liquid crystal display device having two different characteristics, that is, the liquid crystal display device simply using the isotropic phase temperature range and the liquid crystal display device using the nematic phase temperature range can be realized by one liquid crystal display device, and further, the liquid crystal display device having the two different characteristics can be positively properly used.

That is, when the state where display is performed in the isotropic phase temperature range is selected, the voltage having the amplitude larger than the voltage applied in the related art liquid crystal display device is applied, so that the high speed display using the phase transition between the isotropic phase and the nematic phase can be performed. When the state where display is performed in the nematic phase temperature range is selected, driving using the reorientation of directors similar to the related art liquid crystal display device can be performed.

Incidentally, in the liquid crystal display device 10B of the second embodiment, although the example is described in which the peltiert element 38 is used as the heating and cooling unit, no limitation is made to this. For example, a method of circulating a well-known heating and cooling medium, an air cooling method of blowing air kept at a specified temperature, or a liquid cooling method of circulating a liquid kept at a specified temperature can be adopted.

Third Embodiment

In the liquid crystal display device 10A of the first embodiment and the liquid crystal display device 10B of the second embodiment, the description is made on the case where the binary display of light and dark is performed in both the isotropic phase temperature range and the nematic phase temperature range. In both the devices, an excellent halftone display is possible in the nematic phase temperature range similarly to the case of the related art liquid crystal display device. However, in both the devices, when display is performed using the induction and disappearance phenomenon of the nematic phase in the isotropic phase temperature range, although response speed is very high in the case of binary display of light and dark, response speed in the case where a halftone display is performed is rather low.

Figure 6A:
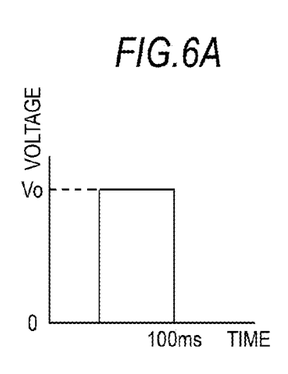
FIGS. 6A to 6C are views showing applied voltage waveforms at the time of halftone display of a liquid crystal display device of a third embodiment.
Figure 6B:
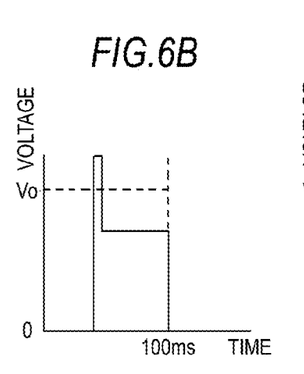
Figure 6C:
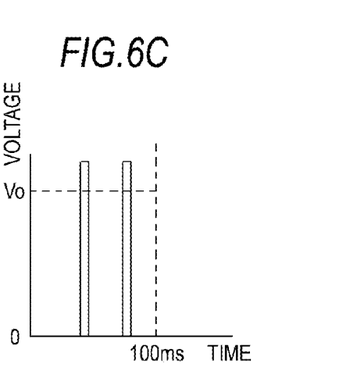
Figure 6D:
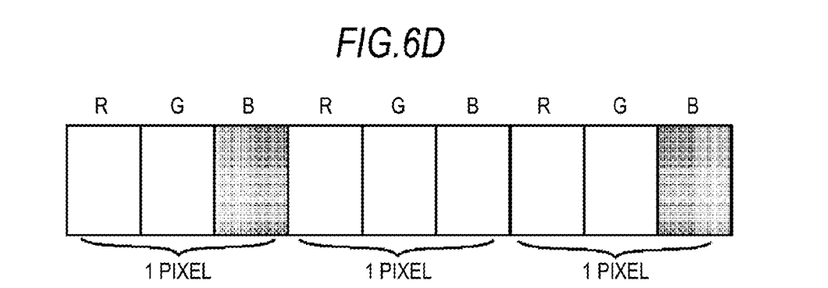
FIG. 6D shows a display example in a case where halftone display is performed by area modulation in a modified example.

Then, in a liquid crystal display device of a third embodiment, a method of performing a halftone display at high response speed by using the induction and disappearance phenomenon of the nematic phase in the isotropic phase temperature range will be described with reference to FIGS. 6A to 6D. FIG. 6A to FIG. 6C are views showing applied voltage waveforms at the time of a halftone display of the liquid crystal display device of the third embodiment, and FIG. 6D shows a display example of a case where a halftone display is performed by area modulation according to a modified example. Besides, in the liquid crystal display device of the third embodiment, the liquid crystal display device 10A of the first embodiment or the liquid crystal display device 10B of the second embodiment is used, and the drive signal voltages applied from the drive unit 35 to the upper electrode and the lower electrode are changed. Thus, a description of the specific structure thereof will be omitted.

In the liquid crystal display device of the third embodiment, a signal made of a pulse voltage is adopted as the drive signal voltage applied from the drive unit 35 to the pixel electrode and the common electrode, and is determined so that an average voltage applied in a corresponding time per frame becomes an applied voltage required for achieving a specified halftone. By that, a halftone display using light transmittance can be quickly performed.

Thus, according to the liquid crystal display device of the third embodiment, when the halftone display is performed, a voltage higher than an applied voltage necessary for obtaining a halftone is applied between a pair of electrodes for a shorter time than an original application time, and is changed to the halftone display voltage at the time point when the specified halftone display is obtained, and the voltage is applied until the original application time is finished. That is, although the desired halftone voltage is generally applied in units of constant period (for example, 1 frame or 1 field), the voltage higher than the desired halftone voltage is applied in the shorter period than the constant period. Besides, as the higher voltage than the applied voltage necessary for the halftone, the voltage higher than a voltage at which the light transmittance at specified temperature is saturated may be adopted.

That is, at the time of a normal halftone display, as shown in FIG. 6A, a voltage V0 indicating a specified constant value is applied for, for example, 100 msec, however, a voltage as shown in FIG. 6B can also be applied. The technique in which the voltage applied between the pair of electrodes is made the higher voltage than the specified voltage for the short time and is then made the specified voltage is the technique known as overdrive. According to the liquid crystal display device of the third embodiment, since the overdrive technique is applied when a halftone display is performed using the induction and disappearance phenomenon of the nematic phase in the isotropic phase temperature range of the liquid crystal forming material, the response speed at the time of the halftone display is improved. Incidentally, with respect to the time point when the specified halftone display is obtained when such pulse voltage is applied, a lookup table is previously prepared experimentally, and at the time of the specified halftone display, reference is made to the lookup table, and the voltage applied between the pair of electrodes is changed.

Besides, in the liquid crystal display device of the third embodiment, as shown in FIG. 6C, a voltage higher than an applied voltage required for obtaining a halftone is applied in time division manner, and a specified halftone display can be performed. This method is the method in which voltage application and non-application are time divided, and the applied voltage is expressed by an average value. This method is the so-called digital driving. Especially, in this case, division is performed per frame, for example, division is performed into 64 parts, and the case of 64/64 can be made to correspond to the case of transmittance of 100%. According to this method, since control can be easily performed to achieve a specified halftone by changing the number of pulses of a voltage having a specific waveform, the control can be performed to a specified halftone with high accuracy by a simple structure control unit. Incidentally, the halftone display method as shown in FIG. 6B and FIG. 6C can be used also when the halftone display in the nematic phase temperature range is performed.

Besides, in the liquid crystal display device of the third embodiment, a method of a modified example in which a halftone display is performed by area modulation will be described with reference to FIG. 6D. In this modified example, a drive signal voltage applied from the drive unit 35 to the pixel electrode and the common electrode is binary driven, and the halftone display is performed by controlling the number of turned-on sub-pixels of a specific color for every plural pixels each including sub-pixels of plural colors.

For example, when three pixels (9 sub-pixels) are made one unit, and a halftone display is performed in which blue (B) is made ⅓ of a state where all pixels are turned on, as shown in FIG. 6D, this can be achieved by turning off two pixels at both sides in three blue sub-pixels in the three pixels and by turning on only the center one pixel. Incidentally, the same effect can be obtained by turning off the adjacent two pixels and by turning on only one pixel at one end.

As the pixels in one unit, not only three pixels, but also two pixels or four pixels can be adopted. However, when the number of pixels in one unit is small, the number of adoptable halftones becomes small, but the fineness becomes high. On the other hand, when the number of pixels in one unit becomes large, the number of adoptable halftones becomes large, but the fineness becomes low.

When the method as described above is adopted, even in the case where the appearance and disappearance phenomenon of the nematic phase in the isotropic phase temperature range of the liquid crystal forming material is used, the sub-pixel to be turned on can be binary driven and high response speed can be achieved. Thus, although higher fineness is sacrificed, lowering of response speed at the time of the halftone display can be suppressed. Besides, the halftone display method can be applied also when the halftone display in the nematic phase temperature range is performed.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A liquid crystal display device comprising:
a first substrate and a second substrate between which a liquid crystal forming material is sandwiched and which are disposed to be opposite to each other;
a pair of electrodes including one electrode and the other electrode;
a control unit for controlling a voltage applied between the pair of electrodes; and
a temperature detector, wherein
the control unit applies a voltage, by which a change of light transmittance occurs based on an induction and disappearance phenomenon of a nematic phase in the liquid crystal forming material, between the pair of electrodes when a temperature of the liquid crystal forming material detected by the temperature detector is in an isotropic phase temperature range, and
the control unit applies a voltage, by which a change of light transmittance occurs based on a change of orientation of directors of the liquid crystal forming material, between the pair of electrodes when the temperature of the liquid crystal forming material detected by the temperature detector is in a nematic phase temperature range.

2. The liquid crystal display device according to claim 1, wherein the control unit applies the voltage having an amplitude, which is larger than that of the applied voltage in the nematic phase temperature range of the liquid crystal forming material, between the pair of electrodes in the isotropic phase temperature range of the liquid crystal forming material.

3. The liquid crystal display device according to claim 1, wherein a polarizing plate is disposed on an outer surface side of each of the first substrate and the second substrate.

4. The liquid crystal display device according to claim 1, wherein an alignment film is disposed on an interface of each of the first substrate and the second substrate to the liquid crystal forming material.

5. The liquid crystal display device according to any one of claims 1 to 4, wherein the one electrode of the pair of electrodes is formed on the first substrate, and the other electrode is formed on the second substrate.

6. The liquid crystal display device according to any one of claims 1 to 3, wherein the pair of electrodes are formed on the first substrate.

7. The liquid crystal display device according to any one of claims 1 to 4, further comprising a temperature control device, wherein
the control device drives the temperature control device and performs is selective driving to cause the isotropic phase temperature range of the liquid crystal forming material or the nematic phase temperature range of the liquid crystal forming material.

8. The liquid crystal display device according to claim 7, wherein the temperature control device is a peltiert element.

9. A driving method of a liquid crystal display device including a first substrate and a second substrate between which a liquid crystal forming material is sandwiched and which are disposed to be opposite to each other, and a pair of electrodes formed on a liquid crystal forming material side of at least one of the first substrate and the second substrate, the driving method of the liquid crystal display device comprising the steps of:
displaying by using a change of light transmittance based on an induction and disappearance phenomenon of a nematic phase in the liquid crystal forming material according to a voltage applied between the pair of electrodes when a temperature of the liquid crystal forming material of the liquid crystal display device is in an isotropic phase temperature range, and
displaying by using a change of light transmittance based on a change of orientation of directors of the liquid crystal forming material according to a voltage applied between the pair of electrodes when the temperature of the liquid crystal forming material of the liquid crystal display device is in a nematic phase temperature range.

10. The driving method of the liquid crystal display device according to claim 9, wherein when the temperature of the liquid crystal forming material of the liquid crystal display device is in the isotropic phase temperature range, the applied voltage at least when a halftone display using the light transmittance is performed includes a pulse voltage whose amplitude is larger than that of a voltage corresponding to the halftone display.

11. The driving method of the liquid crystal display device according to claim 9, wherein when a halftone display using the light transmittance is performed, the voltage applied between the pair of electrodes is binary-driven, and the number of turned-on sub-pixels of a specific color is controlled for every plural pixels each including sub-pixels of plural colors.

* * * * *